(No Model.) 2 Sheets—Sheet 1.
A. F. COGSWELL, W. YOUNG & J. R. HALDEMAN.
ELECTRIC GAS LIGHTING APPARATUS.

No. 341,882. Patented May 18, 1886.

Witnesses:
E. Abhagen
J. A. Pinkston

Inventors
Asa F. Cogswell
William Young
John R. Haldeman
per Rich'd K. Manning
Attorney.

(No Model.) 2 Sheets—Sheet 2.
A. F. COGSWELL, W. YOUNG & J. R. HALDEMAN.
ELECTRIC GAS LIGHTING APPARATUS.
No. 341,882. Patented May 18, 1886.
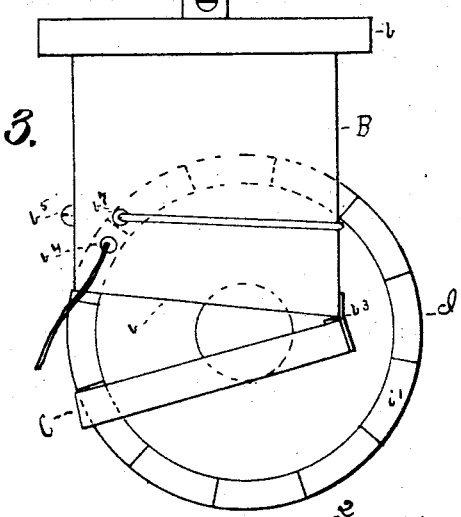
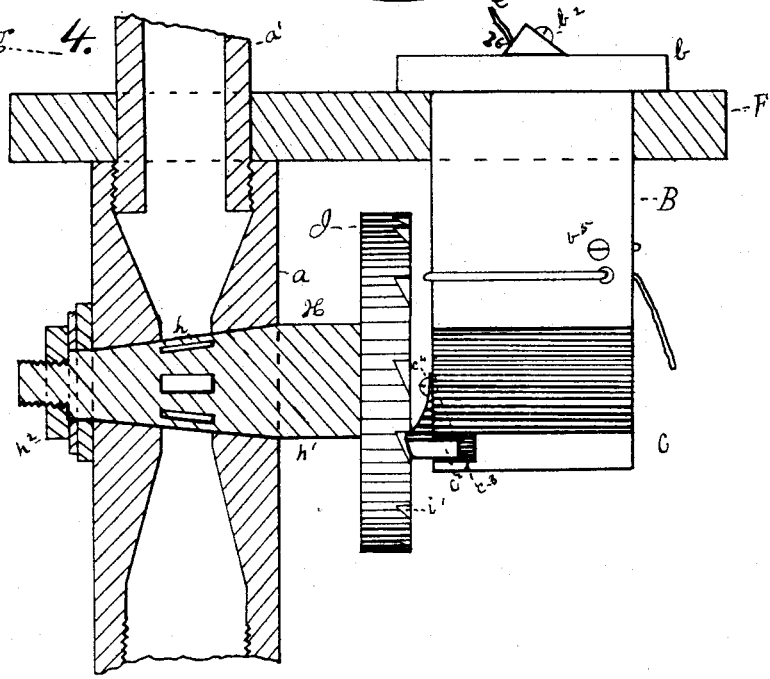
Witnesses.
Inventors

UNITED STATES PATENT OFFICE.

ASA F. COGSWELL, WILLIAM YOUNG, AND JOHN R. HALDEMAN, OF KANSAS CITY, MISSOURI.

ELECTRIC GAS-LIGHTING APPARATUS.

SPECIFICATION forming part of Letters Patent No. 341,882, dated May 18, 1886.

Application filed March 3, 1884. Serial No. 122,852. (No model.)

*To all whom it may concern:*

Be it known that we, ASA F. COGSWELL, WILLIAM YOUNG, and JOHN R. HALDEMAN, citizens of the United States, and residents of Kansas City, in the county of Jackson and State of Missouri, have invented certain new and useful Improvements in Electric Gas-Lighting Apparatus; and we do hereby declare that the following is a full, clear, and exact description of the invention, which will enable others skilled in the art to which it appertains to make and use the same, reference being had to the accompanying drawings, forming part of this specification.

Our invention has for its object to construct an automatic device for controlling the supply of gas through the pipes to the burner, which will alternately open and close the stop-cock, and may be operated by a current of electricity through the medium of a single wire in a simple and reliable manner; and it consists in the novel construction and combination of its several parts, which will first be fully described, and then specifically pointed out in the claim.

Figure 1:
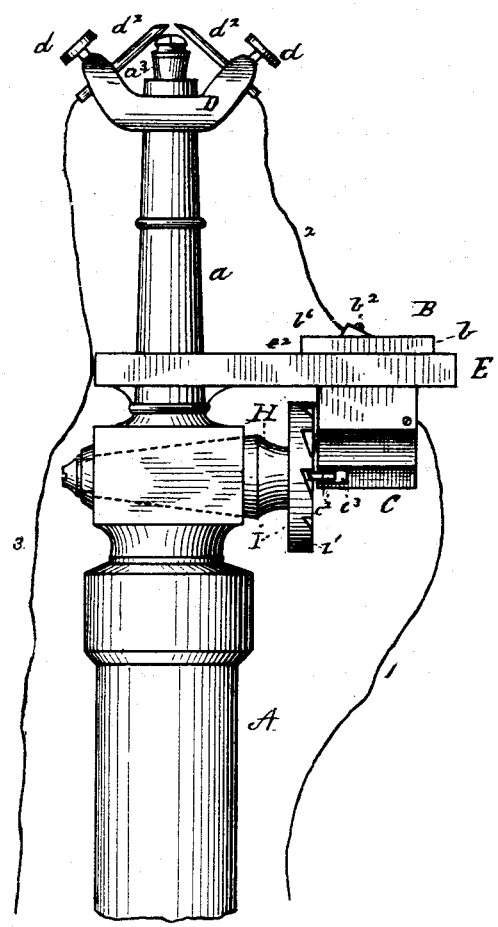
Figure 2:
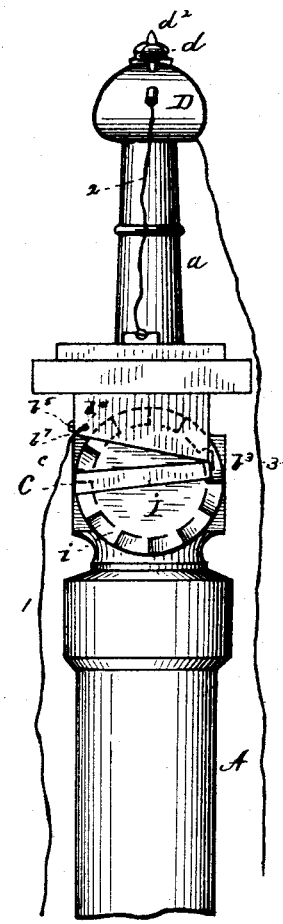

In the drawings, Figure 1 is a side elevation of the gas-supply pipes and of the apparatus for controlling the supply of gas. Fig. 2 is a side view of the supply-pipe and apparatus at right angles to Fig. 1. Fig. 3 is a view of the devices detached from the supply-pipe. Fig. 4 is a view of the crown-wheel and the armature, showing the slot and spring-lever therein.

In the construction of our invention a supply-pipe, A, of suitable dimensions to be employed in the service of supplying the gas, is made the desired length to receive our improved devices.

Around the upper end of section $a$ of the gas-supply pipe, and near the tip $a^3$, is fitted the insulated support D, the outer ends of which are inclined upwardly at a suitable angle, through suitable perforations in which ends, and at right angles, are inserted the carbons $d^2$ $d^2$, placed so that the ends of opposite carbons will approach each other sufficiently near to create a spark of electricity when the circuit is completed. The carbons $d^2$ $d^2$ are held adjustably in place in the insulated support D by means of the screws $d$ $d$, which are inserted through perforations made at right angles to the carbons and in the said insulated support D. An insulated body, E, is then formed to fit around the section of the supply-pipe above the stop-cock, and extended a sufficient distance laterally therefrom to support the electro-magnet B.

The electro-magnet B is made, preferably, square in form, and with the shoulders $b$ at upper end. The lower end portion of the electro-magnet is cut transversely at an angle. A suitable opening, $e^2$, is made vertically through the insulation E and the electro-magnet inserted therein, the shoulder $b$ of which supports it in place.

To the spindle of the stop-cock H is attached a crown-wheel, I, made of glass or other non-conducting material, the ratchet $i$ upon which is placed in an outward direction from the pipe A in close relation to the electro-magnet B.

To the lower depending end of the electro-magnet B is hinged in a horizontal relation one end of a polarized armature, C, by means of an insulated hinge, $b^3$. A longitudinal slot, $c^3$, is then made in the side of the polarized armature C, which is opposite the crown ratchet-disk I, and a spring-lever, $c^2$, inserted therein, securing said spring-lever $c^2$ at one end in slot $c^3$ in the direction of the hinge $b^3$. The lower end of the spring-lever $c^2$ is beveled so as to correspond with the inclined portion of the ratchet-teeth of the crown-wheel. Upon the inner surface of armature C, which is opposite magnet E and near the end of said armature an insulated strip may be placed, if desired. The wire leading from the battery, and marked 1 in the drawings, is wound once or more around the magnet B. We make diagonally through from one side to an adjoining side of the magnet B a perforation, $b^4$, and insert the end of wire 1 through said perforation, and wind said wire around said magnet in the usual way. We then make a perforation, $b^5$, extending a slight distance in said magnet B and a slight distance above the perforation $b^4$, through which the wire 1 is first introduced. The end of wire 1, after being wound around the magnet B, is then inserted in the perforation $b^5$. Through an adjoining side of the said magnet B we make a screw-threaded perforation to engage with the perforation $b^7$, and insert the screw $b^5$, which secures the terminal end of the wire 1, in said perforation $b^7$.

In the upper portion of the electro-magnet B we make a perforation, $b^6$, and insert the end of a separate wire, 2, therein, and secure it in place by the screw $b^2$. The opposite end of wire 2 we attach directly to the end of one of the carbon points. The wire marked 3 is attached to an opposite carbon from that to which wire 2 is attached, and is then connected to other gas-lighting apparatus in series.

In the operation of our apparatus, the wire marked 1 being in connection with an electric battery, as the wires are excited the polarized armature is drawn upwardly toward the electro-magnet, and by means of the spring-lever, which acts upon the crown-wheel, said wheel is rotated so as to turn on the gas.

In our invention we place the spring-lever on the armature in close connection with and in opposite relations to the crown-wheel, whereby one open circuit will alternately turn on as well as cut off the gas, a larger field for the operation of the lever being thus provided for and the crown-wheel rotated through a greater number of degrees by each movement of the lever, and with less expenditure of electricity a more expeditious result is obtained.

The armature may be supported at its free end by an insulator; but we prefer using a stop-hinge on the armature and electro-magnet to govern the fall of the said armature and limit the magnetic field.

The armature may be hinged to a non-conductor on the apparatus, or directly to the magnet and an insulated spring or spring-hinge, to throw down said armature.

Having fully described our invention, what we now claim as new, and desire to secure by Letters Patent, is—

In a gas-lighting apparatus, the combination, with an electro-magnet and suitable electrical conducting-wires connected with the electro-magnet and arranged to create a spark of electricity when the circuit is completed, of a stop-cock on said apparatus and a crown-wheel in said stop-cock, a slotted polarized armature in the field of said electro-magnet and operated thereby, and a spring-lever in said slot in engaging relations with said crown-wheel, for the purpose specified.

In testimony whereof we have hereunto set our hands in the presence of two witnesses.

ASA F. COGSWELL.
WILLIAM YOUNG.
JOHN R. HALDEMAN.

Witnesses:
E. A. STEVENS,
M. BLOCK.